(12) United States Patent
Akkary et al.

(10) Patent No.: US 6,591,342 B1
(45) Date of Patent: Jul. 8, 2003

(54) MEMORY DISAMBIGUATION FOR LARGE INSTRUCTION WINDOWS

(75) Inventors: Haitham Akkary, Portland, OR (US); Sebastien Hily, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/461,410

(22) Filed: Dec. 14, 1999

(51) Int. Cl.[7] .............................................. G06F 12/00
(52) U.S. Cl. ...................................... 711/125; 711/169
(58) Field of Search ................................ 711/119, 125, 711/128, 159, 169, 217; 712/23, 225, 238, 217, 210, 218; 370/390

(56) References Cited

U.S. PATENT DOCUMENTS

| | | | |
|---|---|---|---|
| 5,420,991 A | | 5/1995 | Konigsfeld et al. ......... 395/375 |
| 5,434,987 A | | 7/1995 | Abramson et al. ......... 395/375 |
| 5,564,034 A | * | 10/1996 | Miyake ....................... 711/128 |
| 5,564,111 A | | 10/1996 | Glew et al. ............. 395/185.06 |
| 5,577,200 A | | 11/1996 | Abramson et al. ..... 395/185.03 |
| 5,588,126 A | | 12/1996 | Abramson et al. ......... 395/376 |
| 5,606,670 A | | 2/1997 | Abramson et al. ......... 395/250 |
| 5,613,083 A | | 3/1997 | Glew et al. .................. 395/417 |
| 5,625,835 A | * | 4/1997 | Ebcioglu et al. .............. 712/23 |
| 5,664,137 A | | 9/1997 | Abramson et al. ......... 395/392 |
| 5,694,574 A | | 12/1997 | Abramson et al. ......... 395/467 |
| 5,694,577 A | * | 12/1997 | Kiyohara et al. ............ 711/167 |
| 5,717,882 A | | 2/1998 | Abramson et al. ......... 395/393 |
| 5,724,536 A | | 3/1998 | Abramson et al. ......... 395/392 |
| 5,748,937 A | | 5/1998 | Abramson et al. ......... 395/394 |
| 5,751,983 A | | 5/1998 | Abramson et al. ......... 395/392 |
| 5,767,856 A | * | 6/1998 | Peterson et al. ............ 345/422 |
| 5,826,109 A | | 10/1998 | Abramson et al. ......... 395/859 |
| 5,838,943 A | * | 11/1998 | Ramagopal et al. ........ 712/218 |
| 5,860,154 A | | 1/1999 | Abramson et al. ......... 711/220 |
| 5,881,262 A | | 3/1999 | Abramson et al. ......... 395/392 |
| 5,897,666 A | * | 4/1999 | Mallick et al. .............. 711/217 |
| 5,948,100 A | * | 9/1999 | Hsu et al. .................... 712/238 |
| 5,956,753 A | | 9/1999 | Glew et al. .................. 711/205 |
| 5,999,727 A | * | 12/1999 | Panwar et al. .............. 712/225 |
| 6,006,326 A | * | 12/1999 | Panwar et al. .............. 712/217 |
| 6,035,387 A | * | 3/2000 | Hsu et al. .................... 712/210 |
| 6,058,472 A | * | 5/2000 | Panwar et al. .............. 712/218 |
| 6,061,351 A | * | 5/2000 | Erimli et al. ................ 370/390 |
| 6,141,747 A | * | 10/2000 | Witt ............................ 712/225 |
| 6,145,054 A | * | 11/2000 | Mehrotra et al. ........... 711/119 |
| 6,175,902 B1 | * | 1/2001 | Runaldue et al. ........... 711/159 |

FOREIGN PATENT DOCUMENTS

WO     99/31594     6/1999     ........... G06F/12/10

OTHER PUBLICATIONS

Chrysos, G.Z., et al., "Memory Dependence Prediction Using Store Sets", *Proceedings The 25th Annual International Symposium on Computer Architecture*, 142–153, (Jun. 27–Jul. 1, 1998).

Franklin, M., et al., "ARB: A Hardware Mechanism for Dynamic Reordering of Memory References", *IEEE Transactions on Computers*, vol. 45, 552–571, (May 1996).

Gopal, S., et al., "Speculative Versioning Cache", *Proceedings 1998 Fourth International Symposium on High–Performance Computer Architecture*, 195–205, (Feb. 1–4, 1998).

* cited by examiner

Primary Examiner—David Hudspeth
Assistant Examiner—Fred F. Tzeng
(74) Attorney, Agent, or Firm—Schwegman, Lundberg, Woessner & Kluth, P.A.

(57) ABSTRACT

A memory disambiguation apparatus includes a store queue, a store forwarding buffer, and a version count buffer. The store queue includes an entry for each store instruction in the instruction window of a processor. Some store queue entries include resolved store addresses, and some do not. The store forwarding buffer is a set-associative buffer that has entries allocated for store instructions as store addresses are resolved. Each entry in the store forwarding buffer is allocated into a set determined in part by a subset of the store address. When the set in the store forwarding buffer is full, an older entry in the set is discarded in favor of the newly allocated entry. A version count buffer including an array of overflow indicators is maintained to track overflow occurrences. As load addresses are resolved for load instructions in the instruction window, the set-associative store forwarding buffer can be searched to provide memory disambiguation.

24 Claims, 7 Drawing Sheets

| | 302<br>STA | 304<br>STD | 306<br>SQID | 308<br>OVFLW |
|---|---|---|---|---|
| 310 | 00101 | D0 | 0 | 1 |
| 311 | 10110 | D1 | 1 | 0 |
| 312 | 11000 | D2 | 2 | 0 |
| 313 | 01101 | D3 | 3 | 0 |
| 314 | 01000 | D4 | 4 | 0 |
| 315 | 10001 | D5 | 5 | 0 |
| 316 | 00011 | D6 | 6 | 0 |
| 317 | 11110 | D7 | 7 | 0 |

FIG. 4

400 → SFB

| | 402<br>TAG | 404<br>STD | 406<br>SQID | 420 |
|---|---|---|---|---|
| 410 | 110 | D2 | 2 | SET 00 |
| 411 | 010 | D4 | 4 | SET 00 |
| 412 | 011 | D3 | 3 | SET 01 |
| 413 | 100 | D5 | 5 | SET 01 |
| 414 | 101 | D1 | 1 | SET 10 |
| 415 | 111 | D7 | 7 | SET 10 |
| 416 | 000 | D6 | 6 | SET 11 |
| 417 | | | | |

| | LA | SQID |
|---|---|---|
| 610— | 01101 | 4 |
| 611— | 11110 | 4 |
| 612— | 01000 | 6 |
| 613— | 00101 | 6 |
| 614— | 10101 | 7 |

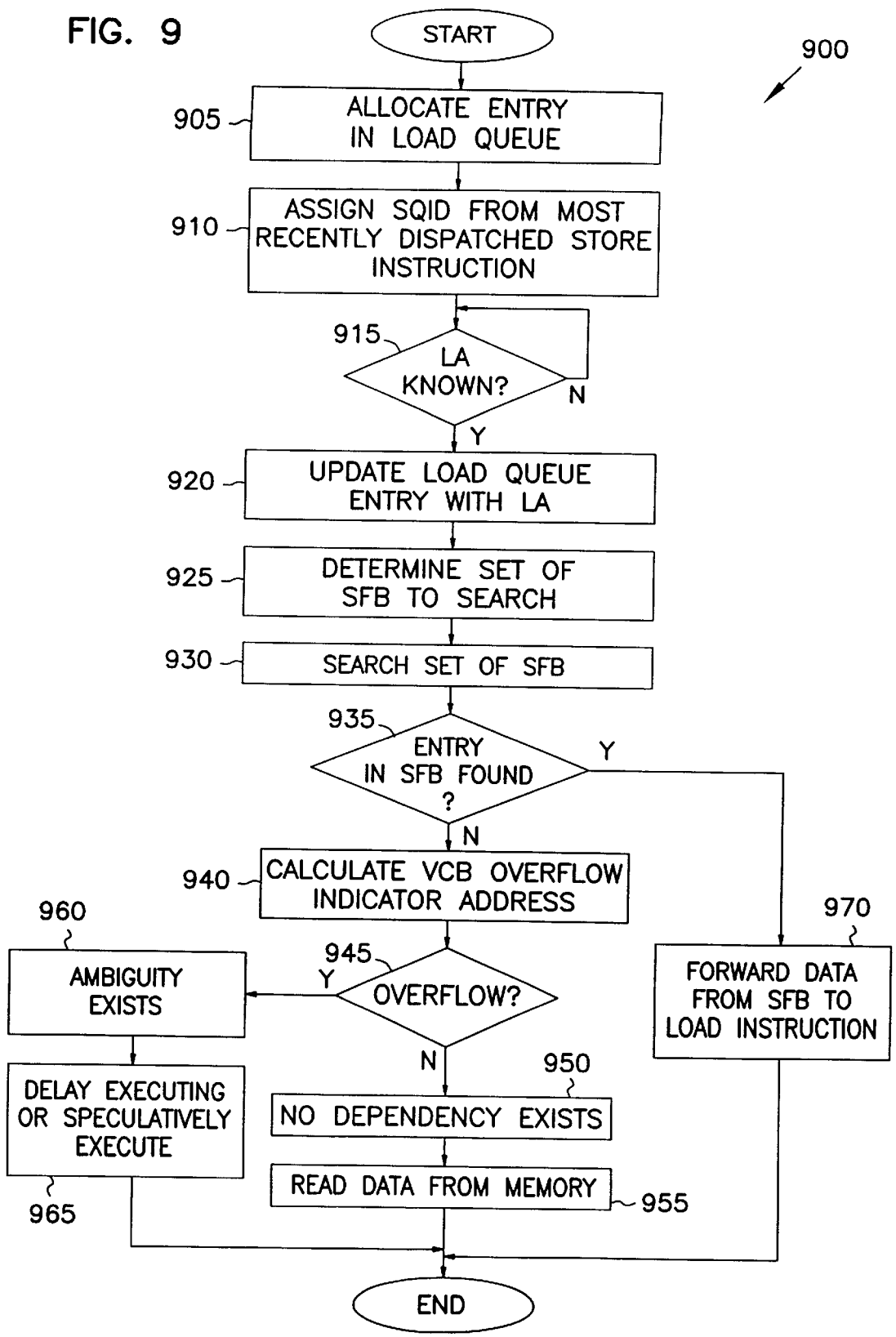

MEMORY DISAMBIGUATION FOR LARGE INSTRUCTION WINDOWS

FIELD OF THE INVENTION

The present invention relates generally to processors having large instruction windows, and more specifically to memory disambiguation in processors having large instruction windows.

BACKGROUND OF THE INVENTION

With every new generation of microprocessors, instruction window sizes are increasing. The term "instruction window" describes the set of processor instructions in various stages of execution at any given time. As newer generations of processors continue to increase the number of parallel execution units and the depth of pipelines, the number of processor instructions in the instruction window at any given time continues to increase.

Some processors with parallel execution units can execute many processor instructions in parallel. This improves program execution speed. Instructions enter the instruction window when they are read from the software program in "program order." "Program order" is the sequential order of the processor instructions in the program. When in the instruction window, different instructions can be scheduled to be executed by different execution units. This can lead to instructions being executed out of program order, or "out-of-order."

The execution order of some processor instructions can be important. Examples include "load" instructions that read the contents of memory locations, and "store" instructions that update the contents of memory locations. For example, if a load instruction and a store instruction that specify the same memory location exist in a program with the store instruction preceding the load instruction in program order, the load instruction is said to be "dependent" on the store instruction. If the dependent load instruction accesses the memory location before the store instruction, the load instruction will read the memory location contents prior to the update by the store instruction, and an error will result. When a load instruction is dependent on a store instruction, the program order of these two instructions should be respected by the processor executing them.

FIG. 1 shows a prior art store queue. Store queue 100 is a fully associative queue that includes information from every store instruction that is in the instruction window. When a store instruction is read from the program, information from the store instruction is deposited in store queue 100, where it stays for as long as the store instruction is in the instruction window. Store queue 100 includes entries 130, each of which including a store address (STA) field 110 and store data (STD) field 120. When a store instruction is encountered in a program, an entry in store queue 100 is allocated, and to the extent that information is available to fill in STA field 110 and STD field 120, they are filled in. When a store instruction is completed, or "retired," the corresponding entry is removed from store queue 100.

When a load instruction is encountered in a program, store queue 100 is searched to see if store queue 100 includes a store instruction upon which the load instruction depends. If one of entries 130 has an STA field 110 that matches the address corresponding to the load instruction, then the load instruction is dependent. If no such store instruction is found in store queue 100, the load instruction can be executed immediately without causing an erroneous out-of-order condition. This is called "memory disambiguation." If a store instruction upon which the load instruction depends is found, then execution of the load instruction can be delayed, or the load instruction can be satisfied by reading the data value from store queue 100 rather than from the memory location. This is called "store data forwarding." Store queue 100 is a fully associative queue that is completely searched each time a load instruction is encountered in a program. The search of store queue 100 takes time. For each load instruction encountered in a program, time is spent in a sequential search of store queue 100 to find any store instructions upon which the load instruction depends, and to find data to satisfy the load instruction with a store data forwarding operation. As instruction windows increase in size, store queue 100 and the associated search time also increase in size. When store queue 100 is very large, the search time can become so large as to cause performance problems.

For the reasons stated above, and for other reasons stated below which will become apparent to those skilled in the art upon reading and understanding the present specification, there is a need in the art for an alternate method and apparatus for providing memory disambiguation.

SUMMARY OF THE INVENTION

In one embodiment, a method of executing instructions in an out-of-order processor includes receiving a decoded instruction such as a store instruction that is configured to store a data value to a memory address. The instruction is inserted in a queue, and the instruction is also assigned to an entry in a set-associative buffer.

In another embodiment, a method of executing instructions includes issuing and removing a store instruction from a queue to a memory such that a data value associated with the store instruction is stored at a memory location specified by a memory address associated with the store instruction. The method also includes searching a set-associative buffer for an entry corresponding to the store instruction, and when the entry corresponding to the store instruction is found, removing the entry from the set-associative buffer.

In another embodiment, a method of executing instructions in an out-of-order processor includes receiving a first decoded instruction that is configured to load a data value from a memory address, and allocating an entry in a queue for the instruction. The method also includes searching a set of a set-associative buffer for a second instruction upon which the first instruction depends.

In another embodiment, a memory disambiguation apparatus includes a queue configured to hold all of the store instructions that are in an instruction window, and a set-associative buffer configured to hold a subset of the store instructions that are in the instruction window. In this embodiment, the set-associative buffer is organized in multiple sets, and each of the store instructions in the set-associative buffer has resolved memory addresses. Each of the multiple sets is configured to be searched for store instructions upon which a load instruction depends.

In another embodiment, a memory disambiguation apparatus includes a set-associative buffer arranged in sets, where each set includes buffer entries, and each of the buffer entries includes a tag field and a data field. In this embodiment, each of the buffer entries corresponds to a separate store instruction in an instruction window. Also included in this embodiment are overflow indicators, where each overflow indicator has a one-to-many relationship with the buffer entries in the set-associative buffer.

BRIEF DESCRIPTION OF THE DRAWINGS

FIG. 3 shows a store queue in accordance with an embodiment of the invention;

FIG. 4 shows a store forwarding buffer in accordance with an embodiment of the invention;

FIG. 9 shows a flowchart of a method for executing load instructions out-of-order in an instruction window.

DESCRIPTION OF EMBODIMENTS

Figure 1:
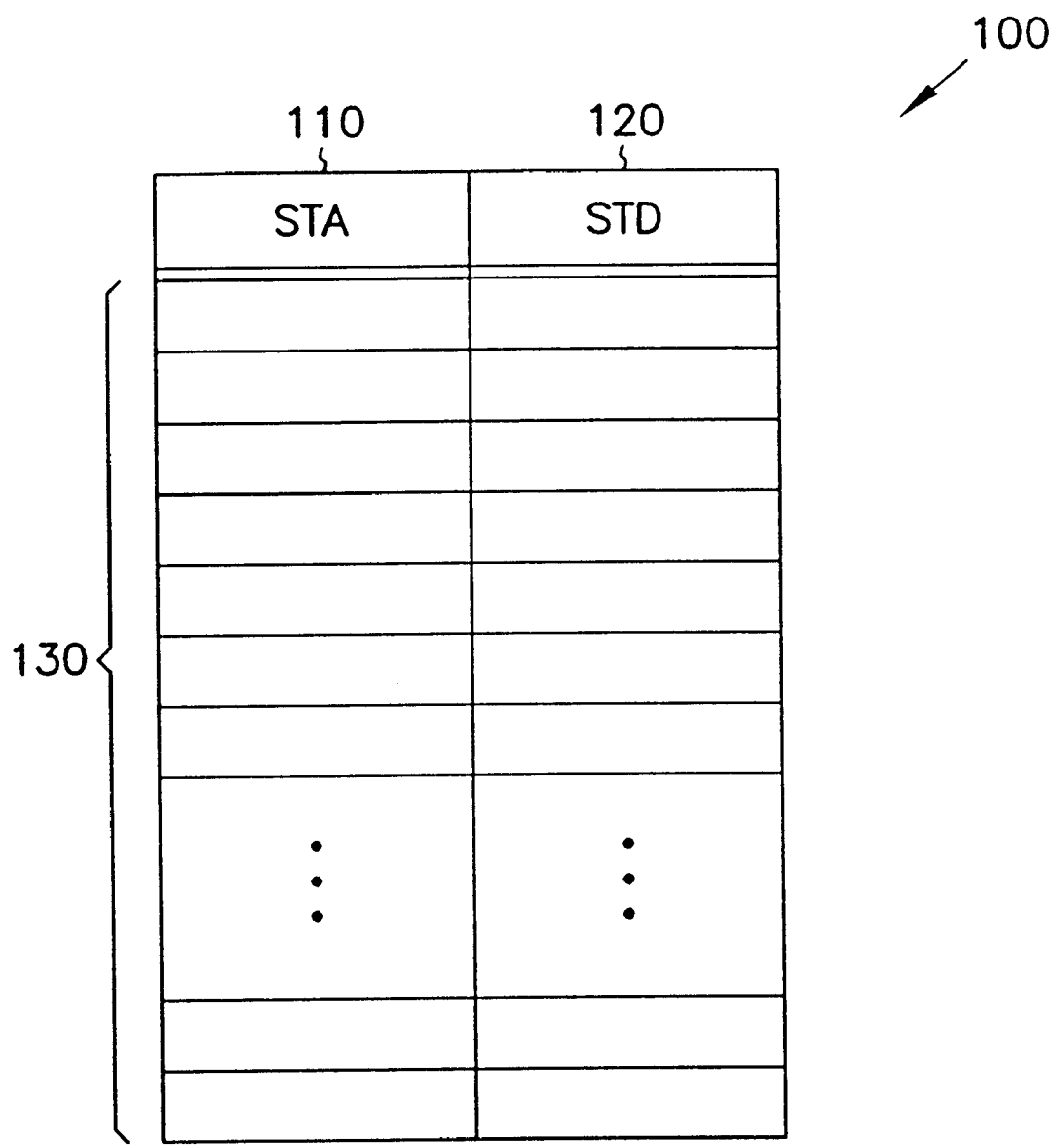
FIG. 1 is a prior art store queue.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Figure 2:
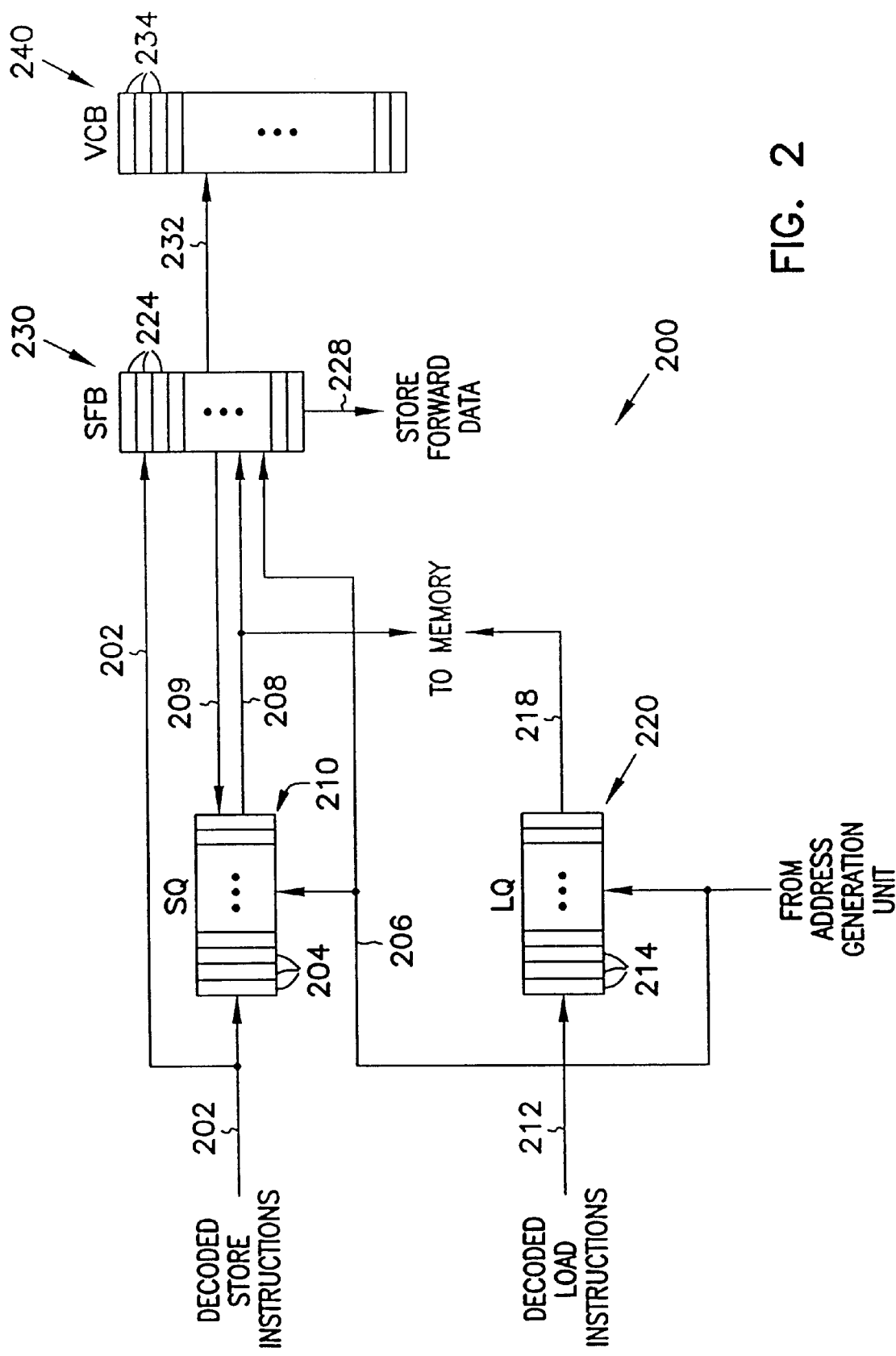
FIG. 2 shows a memory disambiguation apparatus in accordance with an embodiment of the invention.

FIG. 2 shows a memory disambiguation apparatus in accordance with an embodiment of the present invention. Memory disambiguation apparatus 200 includes store queue (SQ) 210, load queue (LQ) 220, store forwarding buffer (SFB) 230, and version count buffer (VCB) 240.

In some embodiments, SQ 210 and LQ 220 are a fixed size, each having a number of locations capable of accepting entries. The term "location" as used herein describes a location within a queue or buffer that may or may not have an entry. The term "entry" as used herein describes a location that is used, or a location that is reserved for use. For example, when SQ 210 is empty, no locations within SQ 210 have entries. When SQ 210 is full, all locations within SQ 210 have entries and no locations are available for use. The term "allocate" as used herein refers to the reservation of a location for use by an entry. For example, when an entry is allocated in SQ 210, a location within SQ 210 is reserved for use by an entry corresponding to a store instruction.

Entries in SQ 210 are allocated in response to the decoding of store instructions. Each entry 204 corresponds to a single store instruction in the instruction window. When a store instruction enters the instruction window, an entry is allocated, and when a store instruction is retired, the entry is de-allocated.

SQ 210 receives information from decoded store instructions on node 202. In some embodiments, SQ 210 also receives resolved addresses from an address generation unit on node 206. In these embodiments, some decoded store instructions have resolved addresses when they are decoded, and other store instructions do not have resolved addresses when they are decoded. An example of an unresolved address can be an address that is to be computed from a register value within the processor. If the register value is not known when the store instruction is decoded, then the address is said to be unresolved. When the register value becomes known at a later time, an address generation unit can resolve the address, and then SQ 210 can receive the resolved address on node 206. SQ 210 can, therefore, include some entries 204 with resolved addresses, and some entries 204 with unresolved addresses.

In some embodiments, entries are allocated for decoded store instructions having unresolved addresses, but no information is written to the newly allocated entry until the resolved address is available. This can save bandwidth on ports into SQ 210. When the resolved address is available, all of the information is written to the entry, thereby using the port once rather than multiple times.

LQ 220 receives information from decoded load instructions on node 212. The information is stored in entries 214. Like SQ 210, in some embodiments, LQ 220 can have some entries 214 with resolved addresses, and some entries 214 with unresolved addresses. Entries 214 with unresolved addresses are updated with address information on node 206 when it becomes available.

In other embodiments, entries are allocated for decoded load instructions having unresolved addresses, but no information is written to the newly allocated entry until the resolved address is available. This can save bandwidth on ports into LQ 220. When the resolved address is available, all of the information is written to the entry, thereby using the port once rather than multiple times.

SFB 230 is a set-associative buffer that is logically divided into sets. SFB 230 receives information from decoded store instructions on nodes 202 and 208. SFB 230 can also receive resolved address information on node 206. The information is stored in entries 224. In some embodiments, SFB 230 has fewer entries than SQ 210, and only includes entries with resolved addresses. For example, if a decoded instruction on node 202 has a resolved address, it can be entered into SFB 230 at substantially the same time that it is entered into SQ 210. If, however, a decoded store instruction on node 202 has an unresolved address, it is not entered into SFB 230 until the corresponding SQ entry has a resolved address. In this case, the store instruction information can be loaded into SFB 230 from SQ 210 on node 208, or can be loaded into SFB 230 at substantially the same time that it is loaded into SQ 210 on node 206.

When a load instruction having a resolved address is encountered, SFB 230 is searched for a store instruction upon which the load instruction depends. In some embodiments, an efficient search of SFB 230 can be made in part because SFB 230 is smaller than SQ 210, it only includes entries with resolved addresses, and it is set-associative.

In some embodiments, SFB 230 is not large enough to hold every store instruction with a resolved address. In these embodiments, VCB 240 is used to hold overflow indicators. When a set within SFB 230 is full, and a new store instruction corresponding to the full set is encountered in the program, an entry in SFB 230 is prepared for the new store instruction and an older store instruction in SFB 230 is discarded. The discarding operation is communicated to SQ 210 on node 209 so that an overflow bit corresponding to the discarded store instruction can be set. The discarding operation is also communicated to VCB 240 on node 232, and as a result VCB records an overflow occurrence. In some embodiments, VCB 240 includes an array of overflow indicators 234, and each overflow indicator 234 is a counter that is incremented each time an overflow occurs. The operation of VCB 240 is described in greater detail with reference to the remaining figures.

FIG. 3 shows a store queue in accordance with an embodiment of the present invention. Store queue (SQ) 300 can be utilized in a memory disambiguation apparatus such as memory disambiguation apparatus 200 (FIG. 2). SQ 300 includes one entry for each store instruction in the instruction window. Each entry includes fields such as store address (STA) field 302, store data (STD) 304, store queue identification (SQID) field 306, and overflow (OVFLW) field 308. When a store instruction is encountered in a program and decoded, an entry is allocated in SQ 300. In some embodiments, the data to be stored is entered in STD field 304 and if a resolved address is available, it is entered into STA field 302. In other embodiments, the data to be stored is not entered in STD field 304 until the resolved address is available, and then STA field 302 and STD field 304 are written to at the same time.

In addition to data and address information, a unique identifier is assigned to the SQID field 306 in each entry. One function of SQID field 306 is to uniquely identify each entry in SQ 300. In some embodiments, SQID fields in entries are assigned consecutive integers. Consecutive integers uniquely identify each entry and they also maintain a record of the program order of the store instructions in the instruction window. For example, if SQID fields are assigned consecutive integers in ascending order, then entries with higher valued SQID fields occur later in program order.

In some embodiments, SQ 300 includes OVFLW field 308. When an entry is discarded from SFB 230 (FIG. 2), the OVFLW field for the corresponding entry in SQ 300 can be set to signify an overflow.

To simplify explanation, the example embodiment of SQ 300 shown in FIG. 3 has a five bit wide STA field 302. This corresponds to a system having thirty-two memory locations addressable by store instructions. In other embodiments, a much larger number of memory locations is addressable, and in these embodiments, the size of STA field 302 is increased accordingly.

SQ 300 is shown with eight example entries. Specifically, entries 310–317 having SQID field 306 values of 0–7 are shown. In this example, the contents of SQ 300 represent a snapshot in time when eight store instructions are in the instruction window. Each store instruction has a SQID field entry numbered consecutively starting with zero. In this example, entry 310 has a SQID field 306 value of zero. This corresponds to the oldest store instruction in the instruction window. Entry 317 has a SQID field 306 value of seven. This corresponds to the newest store instruction in the instruction window. Also in this example, all SQ entries have resolved memory addresses. In some embodiments, not all memory addresses in SQ 300 would be resolved. In some embodiments, SQ 300 is much larger than 8 entries. As instruction windows increase in size, SQ 300 also increases in size.

FIG. 4 shows a store forwarding buffer in accordance with an embodiment of the invention. Store forwarding buffer (SFB) 400 can be a SFB in a memory disambiguation apparatus such as memory disambiguation apparatus 200 (FIG. 2). SFB 400 does not have entries allocated from locations in the same manner as SQ 210 and LQ 220. Instead, SFB 400 is divided into sets, and each set has a number of locations. Entries are allocated within sets, and if a set is full, an overflow condition can occur even if locations are available in other sets of SFB 400.

SFB 400 is shown with eight locations, seven of which have entries. Specifically, entries 410–416 are shown. In this example, the contents of SFB 400 represent the SFB contents at the same snapshot in time referred to above with reference to FIG. 3. The entries in SFB 400 are arranged into sets 420. In the example embodiment of FIG. 4, four sets 420 are defined, each having as many as two entries. For explanatory purposes, the number of sets and the number of possible entries per set are shown as four and two, respectively, in FIG. 4. In some embodiments, SFB 400 is much larger, and has many more sets, and many more possible entries per set.

In some embodiments, each entry includes tag field 402, STD field 404, and SQID field 406. When an entry in SQ 300 (FIG. 3) has a resolved address, a corresponding entry can be made in SFB 400. STD field 404 receives the value of STD field 304, and SQID field 406 receives the value of SQID field 306. In other embodiments, SFB 400 does not include STD field 404. The same data exists in SQ 300, and can be looked up using the value of SQID field 406.

Tag field 402 receives a portion of the address in STA field 302. The remaining information from STA field 302 is used to determine the set 420 into which the entry is made. In the embodiment of FIG. 4, the least significant two bits of the memory address are used to determine the set. For example, when entry 313 is entered into SFB 400, the least significant two bits of the STA field 302 value are examined as "01." Set 01 is chosen in SFB 400, and an entry is allocated for the store instruction. SFB 400 is shown having entry 412 which corresponds to entry 313 of SQ 300. Both entries have a SQID value of three, and both have the same value in the STD field. Tag field 402 for entry 412 receives the remaining bits from the STA field 302 value of entry 313. Tag field 402 of entry 412 has the value "011," which when combined with "01" from set 01, yields the address value "01101," which is the value of STA field 302 for entry 313.

In the embodiment shown in FIG. 4, the least significant two bits are used to determine the set into which the entry is made. In other embodiment, the most significant bits are used for this purpose. In still other embodiments, bits other than the most significant and least significant are used. For example, in a system having "pages" of memory, use of the least significant bits of a page address can result in neither the most significant nor the least significant bits of the full address being used.

In the example embodiment of FIGS. 3 and 4, entries are made in SQ 300 in program order and are assigned SQID field 306 values in consecutive order. In some embodiments, if a resolved memory address is not available at the time the entry in SQ 300 is made, STA field 302 for the entry is not filled in. Instead, STA field 302 is filled when a resolved memory address is available. In some embodiments, the resolved memory address is received on a node such as node 206 (FIG. 2) from an address generation unit. To simplify the discussion of allocating entries in SFB 400, a simplifying assumption is made that all addresses are resolved when SQ 300 entries are allocated. One skilled in the art will understand that when not all addresses are resolved at the time SQ 300 entries are allocated, the order in which SFB 400 entries are allocated can be different than that presented here.

As previously stated, the example contents of SQ 300 and SFB 400 represent a snapshot in time when eight store instructions are in the instruction window. The events occurring prior to this snapshot in time are now described to illustrate the operation of the store queue and store forwarding buffer.

After the store instruction corresponding to entry 310 is decoded, entry 310 is allocated in SQ 300. When allocated, entry 310 would have values the same as that shown in FIG. 3 with the exception that OVFLW field 308 would have a "0," indicating that there had been no overflow. A corresponding entry is allocated in SFB 400. Since the value of STA field 302 in entry 310 is "00101," an entry is allocated in set 01 of SFB 400. The entry in SFB 400 corresponding to entry 310 in SQ 300 is not shown because it is later discarded when entry 413 is allocated in SFB 400. This is explained more fully below. After entry 310 and the corresponding entry in SFB 400 are allocated, and before the next store instruction is decoded, there is one store instruction in the instruction window, and SQ 300 and SFB 400 each have one entry corresponding to that store instruction.

When the store instruction corresponding to entry 311 is decoded, entry 311 is allocated in SQ 300, and entry 414 is allocated in SFB 400 in a manner similar to that previously described with reference to entry 310 and its corresponding entry in SFB 400. Entry 414 is allocated in set 10 because the least significant two bits of STA field 302 in entry 311 are "10." The third store instruction corresponds to entry 312 in SQ 300 and entry 410 in SFB 400. The fourth store instruction corresponds to entry 313 in SQ 300 and entry 412 in SFB 400. After entry 412 is allocated in SFB 400, set 01 of SFB 400 is full. There is not yet an overflow, but because one of the two possible entries is occupied by entry 412, and the other possible entry is occupied by the entry corresponding to the first store instruction, the two possible entries in set 01 are full. The fifth store instruction is decoded and entry 314 is allocated in SQ 300 and entry 411 is allocated in SFB 400.

The sixth store instruction causes an overflow in SFB 400. The sixth instruction corresponds to entry 315 in SQ 300. A value of "10001" is entered into STA field 302 of entry 315. The corresponding entry in SFB 400 will be allocated in set 01 because the two least significant bits of the value are "01," but set 01 is already full with two entries: one corresponding to SQID value of zero, and one corresponding to SQID value of three. In the embodiment of FIGS. 3 and 4, when an overflow occurs, if the incoming store is the oldest, then the incoming store is not written and an overflow counter is incremented. If the incoming store is not older than the oldest already-existing entry in the overflowing set, then the oldest already-existing entry is discarded and an overflow counter is increased. In some embodiments, SFB 400 includes a "wrap-around" bit for each entry. When SQID values are reused, such as when a five bit SQID field counts past 31 and back to zero, the wrap-around bit is used to note that the SQID field has wrapped around. In this example, the oldest already-existing entry is the entry with an SQID value of zero. This entry is discarded from SFB 400 in favor of entry 413, and the overflow is noted in OVFLW field 308 in entry 310.

In this example, the remaining store instructions are decoded and entries corresponding thereto are allocated in both SQ 300 and SFB 400. There are eight instructions in the instruction window as shown by eight entries in SQ 300, but there are only seven entries in SFB 400 because one overflow has occurred. Less than seven entries would be in SFB 400 if more overflows had occurred.

As is explained more fully below, SFB 400 can be efficiently searched for store instructions upon which load instructions depend. Since the buffer is set-associative, only the members of the set corresponding to the load instruction memory address are searched. As the number of sets increases, the time taken for the search operation becomes shorter.

Figures 5, 6:
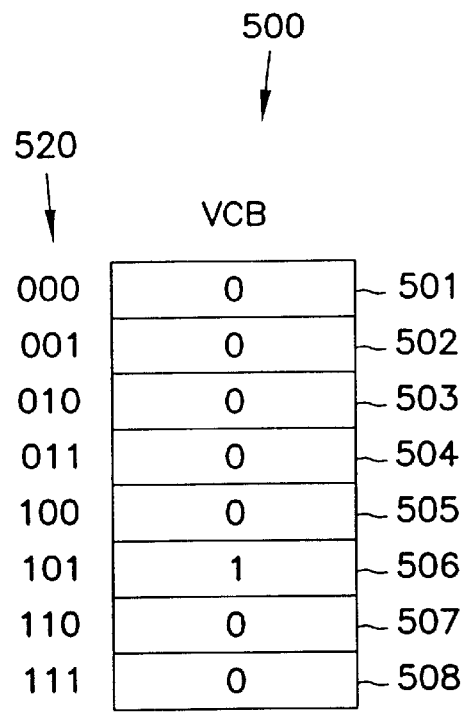
FIG. 5 shows a version count buffer in accordance with an embodiment of the invention.
FIG. 6 shows a load queue in accordance with an embodiment of the invention.

FIG. 5 shows a version count buffer in accordance with an embodiment of the invention. Version count buffer (VCB) 500 can be a VCB in a memory disambiguation apparatus such as memory disambiguation apparatus 200 (FIG. 2). In the embodiment of FIG. 5, VCB 500 includes an array of overflow indicators, and each overflow indicator is a counter. When an SFB such as SFB 400 (FIG. 4) overflows, one of the counters in the array is incremented. After the store data has been sent to memory, if the overflow bit (OVFLW 308) in the store queue is set, the corresponding counter in the VCB is decremented. If the store is present in the SFB, the corresponding entry is cleared. The store entry in the store queue is cleared.

For ease of explanation, VCB 500 is shown having an array size of eight. In some embodiments, the size of VCB 500 is much larger. VCB 500 can be as large as the set of addressable memory locations, but then an overflow indicator would be kept for each addressable memory location, which would effectively double the size of the memory. In some embodiments, the size of VCB 500 is a fraction of the size of the addressable memory. In these embodiments, each overflow indicator is used for multiple addressable memory locations. This results in a savings in VCB size in exchange for a possibility of an ambiguity. The possible ambiguity due to the one-to-many relationship of the overflow indicators to the addressable memory locations is explained more fully below.

In the embodiment of FIG. 5, VCB 500 is an array of counters. Each counter is addressable using addresses 520. When an SFB entry is discarded, the memory address (which is a combination of the value of tag field 402 and the identifier for the set holding the entry) is used to determine which counter in VCB 500 is to be incremented. In the embodiment of FIG. 5, the counter values shown reflect the state of VCB 500 when SQ 300 and SFB 400 are in the states shown in FIGS. 3 and 4. When the SFB entry corresponding to SQID value of zero is discarded from SFB 400, the address of "00101" is used to determine which of the array of counters to use as an overflow indicator. In the embodiment of FIG. 5, VCB 500 has eight locations, which makes each counter addressable with three bits. The least significant three bits are used to determine the counter, so overflow indicator 506, which resides at address "101" is incremented.

In the embodiment of FIG. 5, the least significant three of the five possible address bits are used to determine the overflow indicator. This results in aliasing because four possible store addresses will share the same overflow indicator. For example, overflow indicator 506 is used for store address "00101," "01101," "10101," and "11101." This results in an ambiguity as is explained more fully below. Further, it is not important that the least significant bits be used to determine the correct overflow indicator. Indeed, any of the bits could be used. If any subset of the address bits is used to address VCB 500, aliasing can occur and can cause ambiguities.

Referring now back to FIG. 3, OVFLW field 308 of entry 310 indicates that the corresponding entry in SFB 400 was discarded. When the store instruction corresponding to entry 310 is sent to memory, entry 310 is removed from SQ 300. Since the execution of the store instruction is complete, and the contents of the memory at the store location have been updated, a load instruction can no longer be dependent on the store instruction. As a result, when the store instruction is retired, the overflow indication in OVFLW field 308 is sensed, and the corresponding overflow indicator in VCB 500 is decremented. This removes the overflow indication, and the ambiguity referred to above disappears.

FIG. 6 shows a load queue in accordance with an embodiment of the invention. Load queue (LQ) 600 can be a load queue in a memory disambiguation apparatus such as memory disambiguation apparatus 200 (FIG. 2). LQ 600 includes entries corresponding to decoded load instructions currently in the instruction window. The entries are allocated in LQ 600 in program order as they are received. Like store instructions, load instructions may or may not have resolved memory addresses when they enter LQ 600.

After decoding a load instruction, an entry is made. A resolved address is entered into load address (LA) field 602 and SQID field 606 takes the SQID value of the most recent entry in SQ 300 (FIG. 3). For example, entry 610 in LQ 600 has a value of four in SQID field 606. When entry 610 was made into LQ 600, SQ 300 only had entries corresponding to SQID values of 0–4. By having the SQID value attached to an entry in LQ 600 in this way, the program order of the load instruction is maintained, at least with respect to the store instructions in the instruction window.

When a load address is resolved, the address is written in the LA field 602 of a particular entry in LQ 600, the address is sent to the data cache and a search for store instructions upon which the load instruction depends is performed. LQ 600 is shown with five entries. The search for store instructions upon which each of the five load instructions depend is now presented to illustrate a few of the possible outcomes from a search operation.

Load address of "01101" is associated to an SQID of four. A search is performed for a store instruction earlier in the program order that will store to the same address. Set 01 of SFB 400 is searched for entries having a SQID less than or equal to four and having a tag field value of 011. The entry is found at entry 412. The load instruction written into LQ entry 610 is dependent on the store instruction corresponding to SFB entry 412. The load instruction can be executed by reading the data value in STD field 404 of entry 412 because a matching entry in SFB 400 is the latest store instruction in program order that will write to the address of interest. As a result of finding entry 412, the load instruction corresponding to entry 610 can be executed without accessing external memory. This is called store data forwarding.

It is instructive to note that the least significant three bits of the LA field 602 of entry 610 are "101." If VCB 500 had been consulted during the search, an ambiguity would result because an overflow indication specified by a subset of the store address would be found. In the case of entry 610, however, it is not necessary to consult VCB 500 because a matching entry was found in SFB 400.

Load address of "11110" is associated to an SQID of four. A search is performed for a store instruction earlier in program order that will store to the same address. Set 10 of SFB 400 is searched for entries having a SQID less than or equal to four and having a tag field value of 111. It is not found. Entry 415 corresponds to a store to the address of interest, but it occurs later in program order than the load instruction corresponding to entry 611, and so does not create a dependency. After not finding an entry in SFB 400, VCB 500 is consulted to see if a matching entry may have been discarded from SFB 400 in the past. The correct overflow indicator is at address 110 as specified by the least significant three bits of LA field 602 of entry 611. Overflow indicator 508 indicates that no overflows have occurred, and so no store instructions upon which the load instruction could depend currently exist in the instruction window. Memory disambiguation has been successfully performed, and the load instruction corresponding to entry 611 can be executed without causing an erroneous out-of-order condition.

Load address of "01000" is associated to an SQID of six. A search is performed for a store instruction earlier in program order that will store to the same address. Set 00 of SFB 400 is searched for entries having a SQID less than or equal to six and having a tag field value of 010. A matching entry is found as entry 411. Data store forwarding can be performed, and the load instruction corresponding to entry 612 can be retired.

Load address of "00101" is associated to an SQID of six. A search is performed for a store instruction earlier in program order that will store to the same address. Set 01 of SFB 400 is searched for entries having a SQID of less than or equal to six and having a tag field value of 001. A matching entry is not found in SFB 400, so VCB 500 is consulted. Overflow indicator 506 is consulted because the address of overflow indicator 506 is 101, which corresponds to the least significant three bits of the store address being searched for. Overflow indicator 506 indicates an overflow condition, and an ambiguity results. Any one of four possible addresses could have caused the overflow indication. In this example, there is an actual dependency because the store address that was discarded from SFB 400 (entry 310 of SQ 300) is the same as the address being searched for, but the overflow indication does not resolve the ambiguity. At this point, the system can assume that a dependency exists, and delay executing the load instruction until the ambiguity disappears, or the system can speculatively execute the load instruction while maintaining the possibility that the load instruction will have to be re-executed if it is discovered that a dependency actually exists. In this example, if the load instruction is speculatively executed, it will have to be re-executed after the store instruction upon which it depends retires.

Load address of "10101" is associated to an SQID of seven. A search is performed for a store instruction earlier in program order that will store to the same address. Set 01 of SFB 400 is searched for entries having a SQID of less than or equal to seven and having a tag field value of 101. A matching entry is not found in SFB 400 so VCB 500 is consulted. Overflow indicator 506 is consulted because the address of overflow indicator 506 is 101, which corresponds to the least significant three bits of the store address being searched for. Overflow indicator 506 indicates an overflow condition, and an ambiguity results. Any one of four possible addresses could have caused the overflow indication. In this example, there is no actual dependency because the store address that was discarded from SFB 400 is not the same as the address being searched for, but the overflow indication does not resolve the ambiguity. At this point, the system can assume that a dependency exists, and delay executing the load instruction until the ambiguity disappears, or the system can speculatively execute the load instruction while maintaining the possibility that the load instruction will have to be re-executed if it is discovered that a dependency actually exists. In this example, if the load instruction is speculatively executed, it will not have to be re-executed because no actual dependency exists.

Figure 7:
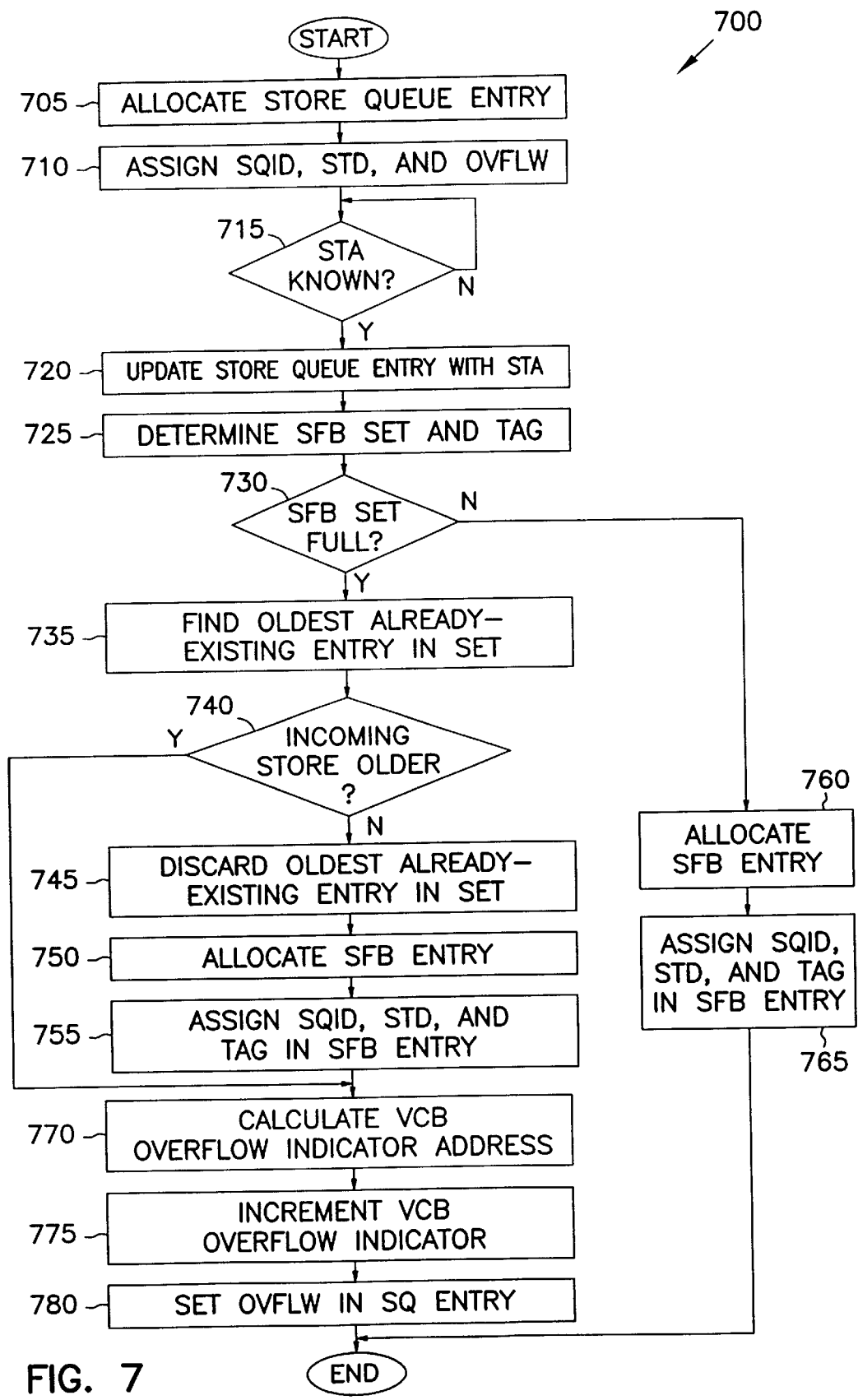
FIG. 7 shows a flowchart of a method for executing store instructions out-of-order in an instruction window.

FIG. 7 shows a flowchart of a method for executing store instructions out-of-order in an instruction window. Method 700 begins when a store queue entry is allocated in action box 705. The store queue entry is allocated in response to a store instruction being decoded and entering the instruction window. In action box 710, the newly allocated store queue entry has fields assigned. A store queue identification (SQID) field is assigned to the new queue entry so that it may be uniquely identified. A store data (STD) field also has a value assigned. The store data field can include data that was present in the store instruction, or may include data that was generated as a result of the store instruction being executed. An overflow (OVFLW) field is also assigned in the new queue entry. The overflow field is initialized to indicate a "no overflow" condition.

When store instructions are decoded, the store address may or may not be known. The store address is the address to which the store instruction will store data. When a store instruction includes the store address, such as in a direct addressing mode, the store address is known at the time the store queue entry is allocated. When a store instruction does not include the store address, the store address can be generated from register values, or by an address generation unit. Decision box 715 checks to see if the store address is known. If not, processing remains in action box 715 until the store address is known. When the store address is known, processing continues in action box 720. In some embodiments, the store address becomes known when an address generation unit provides the store address. One such embodiment is shown in FIG. 2, where the store address is provided to store queue 210 from an address generation unit on node 206. In action box 720, the store queue entry is updated with the store address.

The store queue maintains an entry for each store instruction currently in the instruction window. In some embodiments, the SQID is assigned in consecutive order such that the program order of the store instructions in the instruction window can be determined by comparing SQID values. As instruction windows become larger in size, the store queue also becomes large in size. As a result of the large size, searching the store queue can become inefficient.

In addition to the store queue entry, a store forwarding buffer entry is made. In some embodiments, the store forwarding buffer is a set-associative buffer with efficient search capabilities. For example, entries within the store forwarding buffer are organized into sets such that when a search is performed, it can be confined to a single set, thereby resulting in a more efficient search. The remainder of method 700 further explains the entry of store instruction information into the store forwarding buffer.

When the store address is in the store queue entry, a store forwarding buffer entry can be made. Each entry has a tag field, and the combination of the set and tag determine the store address. The store forwarding buffer set and tag are determined in action box 725. The store forwarding buffer set can be generated from a subset of the store address. In some embodiments, the set is determined from the least significant bits of the store address. One such embodiment is shown in FIG. 4. The tag can be generated from the remaining bits in the address.

Once the store forwarding buffer set is determined in action box 725, the set is checked for a full condition in decision box 730. If the set is not full, processing continues in action box 760 where a store forwarding buffer entry is allocated. After the store forwarding buffer entry is allocated, the entry is populated with fields in action box 765. A tag field receives a tag value determined in action box 725, and a SQID field and STD field receive values from the corresponding fields in the store queue entry. After action box 765 is complete, the dispatched store instruction has a store queue entry and a store forwarding buffer entry associated therewith. The store forwarding buffer entry is in a set that is smaller than the entire store forwarding buffer, thereby providing an efficient search mechanism. Store forwarding buffer entries can be found during a search operation that searches a subset of the entire store forwarding buffer.

If the set is found to be full in decision box 730, processing continues with action box 735 where the oldest already-existing entry in the set is found. The age of the oldest already-existing entry is compared against the age of the incoming store instruction in decision box 740. In some embodiments, the set is also searched for existing entries with the same tag field value, and if found, its age is compared against that of the incoming store instruction.

When the incoming store is older, the incoming store is discarded, and processing continues with action box 770. When the oldest already-existing entry is older than the incoming store instruction, the oldest already-existing entry is discarded in action box 745. In some embodiments, the age of the incoming store instruction is compared against the age of the oldest entry corresponding to the same address. In these embodiments, when an entry is found and discarded, the discarded entry is not necessarily the oldest already-existing entry. An entry in the store forwarding buffer for the incoming store instruction is then allocated and populated in action boxes 750 and 755 respectively. When either the oldest entry is discarded or the incoming store is not assigned to an entry, an overflow indication is recorded, as is explained below.

In action box 770, a version count buffer (VCB) overflow indicator address is calculated from the discarded information. When an existing entry is discarded, the VCB overflow indicator address is derived from the discarded entry. When an incoming store is not assigned to an entry, the VCB overflow indicator address is derived from the incoming store. In some embodiments, the version count buffer overflow indicator address is generated using the least significant bits of the store address. This can be formed mathematically with a modulo operation. For example, where the plurality of overflow indicators are N in number, the overflow indicator address can be generated as the address modulo N. In other embodiments, the version count buffer overflow indicator address is calculated using a different subset of the store address. For example, the most significant bits of the address can be used to calculate the version count buffer overflow indicator address. As described with reference to the earlier figures, when a subset of the store address is used to calculate the version count buffer overflow indicator address, ambiguities can result. For example, multiple store addresses can be associated with a single overflow indicator address, thereby causing an ambiguity as to which store address corresponds to the overflow occurrence.

In action box 775, the version count buffer overflow indicator is incremented to indicate an overflow condition. Prior to incrementing the version count buffer overflow indicator, it is checked to see if it is already at a maximum value. If it is at a maximum value, error processing can take place, such as generating a fault in the processor. The overflow (OVFLW) field in the store queue entry corresponding to the discarded information is modified to indicate an overflow in action box 780. The OVFLW field is useful when retiring store queue entries, as is explained more fully below with reference to FIG. 8.

Figure 8:
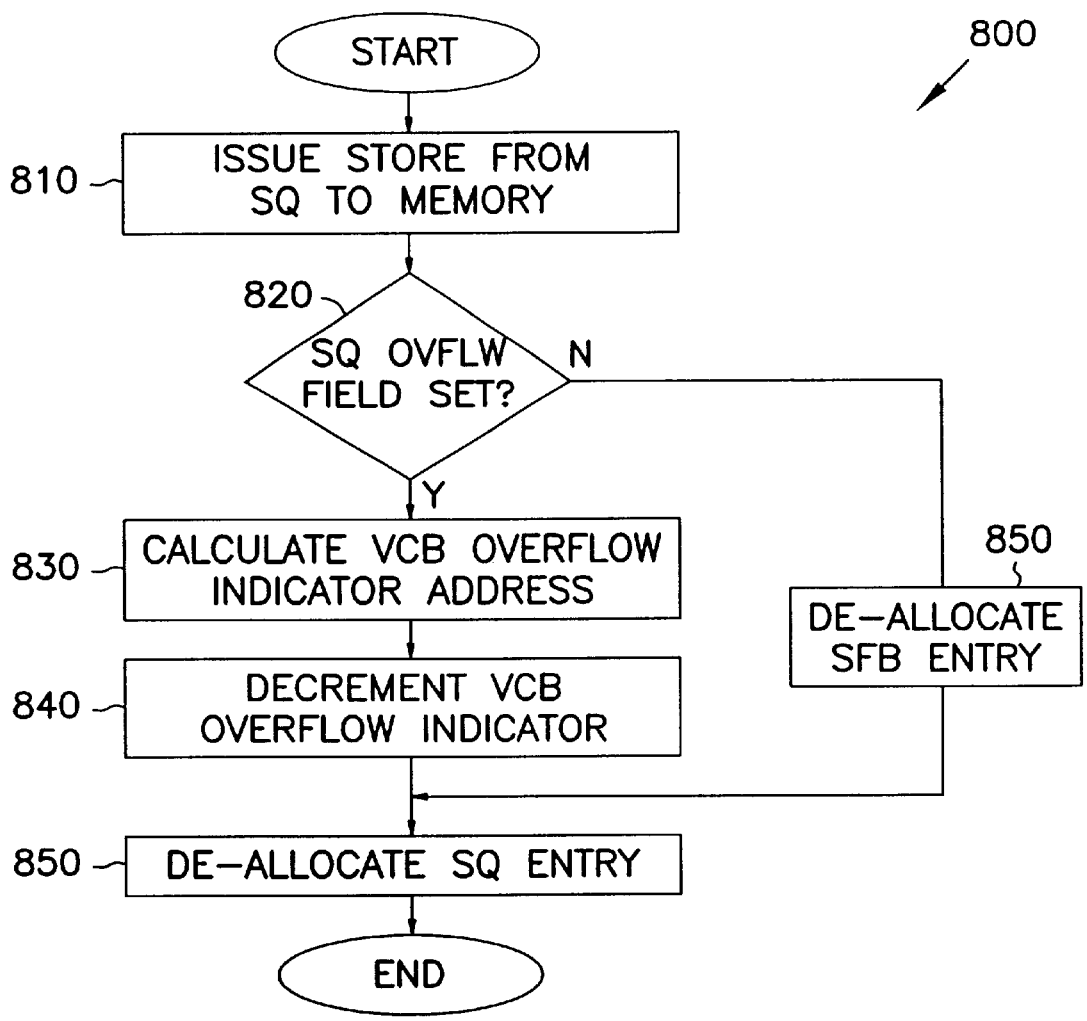
FIG. 8 shows a flowchart of a method for executing store instructions in an instruction window.

FIG. 8 shows a flowchart of a method for executing store instructions from an instruction window. Method 800 begins in action box 810 when a store instruction is issued from a store queue to memory. Issuing a store instruction from the store queue to memory generates a physical memory write that updates a memory location. The memory location can be in a data cache or in any other memory device capable of being written to. An example of action box 810 can be illustrated with reference to entry 310 of store queue 300 (FIG. 3). When the store instruction corresponding to entry 310 is issued from store queue 300 to memory, the data value represented by "D0" in STD field 304 is written to address "00101" as specified by the value stored in STA field 302.

The overflow field of the store queue is checked in decision box 820. When the overflow field indicates that no overflow has occurred, then the store forwarding buffer entry is de-allocated in action box 850. When the overflow field indicates that an overflow has occurred, the version count buffer overflow indicator address is calculated in action box 830. This is performed in the same manner as in action box 770 of method 700 (FIG. 7). In action box 840, the version count buffer overflow indicator is decremented. In action box 860, the store queue entry is de-allocated. After method 800 is complete, the store instruction corresponding to the de-allocated entry has been retired, and is no longer in the instruction window.

FIG. 9 shows a flowchart of a method for executing load instructions out-of-order in an instruction window. Method 900 begins in action box 905 when a load queue entry is allocated. A load queue entry is allocated in response to a load instruction being decoded and dispatched into the instruction window. In action box 910, a SQID value is assigned to the newly allocated load queue entry from the most recently dispatched store instruction. For example, referring now back to FIG. 7, SQID values are assigned to newly dispatched store instructions in action box 710. In action box 910, the newly allocated load queue entry can retrieve a SQID value from the most recently allocated store queue entry. This serves as a place-holder to identify the load instruction's program order with respect to store instructions in the instruction window.

As previously described, load addresses associated with load instructions may or may not be known when the load instruction is decoded. Processing remains in decision box 915 until the load address is known, and then continues to action box 920. In action box 920 the load queue entry is updated with the load address. At this point, the load instruction can be executed without creating an erroneous out-of-order condition as long as it is not dependent on a store instruction currently in the instruction window. The remainder of method 900 includes actions that attempt to determine whether the load instruction is dependent upon a store instruction currently in the instruction window.

In action box 925, the identity of a set in a store forwarding buffer is determined. The set is searched in action box 930. The set to be searched can be specified by a subset of the load address. The set of the store forwarding buffer is searched for a store instruction occurring earlier in program order that has a store address the same as the load address for the current load instruction. The store address is a combination of the identity of the set and the tag field value within the store forwarding buffer. The generation of the tag field value and the identification of the set is the same as that carried out in action box 725 of method 700 (FIG. 7).

If one or more entries are found in the store forwarding buffer, decision box 935 transfers processing to action box 970 where data from the youngest matching entry in the store forwarding buffer is forwarded to the load instruction.

Data can be forwarded from the store forwarding buffer to the load instruction because if an entry is found in the store forwarding buffer, it is the most recent store instruction upon which the load instruction is dependent. The load instruction could be delayed until the store instruction corresponding to the store forwarding buffer entry is retired, but forwarding data from the store forwarding buffer to the load instruction allows for faster execution.

If an entry is not found in the store forwarding buffer, decision box 935 transfers processing to action box 940 where a version count buffer overflow indicator address is calculated. This calculation is the same as that carried out in action box 770 of method 700 (FIG. 7). The overflow indicator is queried in decision box 945. If no overflow exists, then no store instruction upon which the load instruction depends currently exists in the instruction window, as is shown in action box 950. As a result, data can be read from memory in action box 955 without causing an erroneous out-of-order condition.

If the version count buffer overflow indicator indicates an overflow, then an ambiguity exists as to whether or not a store instruction upon which the load instruction depends is currently in the instruction window. This is shown in action box 960. In action box 965 the load instruction is speculatively executed, or the executing of the load instruction is delayed until the ambiguity is removed.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of executing instructions in an out-of-order processor, the method comprising:
   receiving a first instruction to store a data value to a memory address;
   allocating a queue entry that corresponds to the first instruction; and conditionally assigning the first instruction to an entry in a set-associative buffer.

2. The method of claim 1 wherein conditionally assigning the first instruction to the entry in the set-associative buffer comprises:
   selecting a first set in the set-associative buffer; and
   when the first set is not full, assigning the first instruction to the first set.

3. The method of claim 2 further comprising:
   when the first set is full and an existing entry of the first set is older than the first instruction, discarding the existing entry of the first set and recording an overflow occurrence.

4. The method of claim 3 wherein recording an overflow occurrence comprises modifying an overflow indicator, the overflow indicator being one of a plurality of overflow indicators, including generating an overflow indicator address from the existing entry of the first set, and incrementing a value at the overflow indicator address.

5. The method of claim 4 wherein the plurality of overflow indicators are N in number, and generating the overflow indicator address comprises determining the memory address modulo N.

6. The method of claim 2 further comprising:
   when the first set is full and an existing entry of the first set is not older than the first instruction, not assigning the first instruction to an entry in the set associative buffer, and recording an overflow occurrence.

7. A method of executing store instructions, the method comprising:

issuing a first store instruction from a queue to a memory, the first store instruction having a memory address and a data value associated therewith;

removing the first store instruction from the queue;

searching a set-associative buffer for an entry corresponding to the first store instruction; and when the entry corresponding to the first store instruction is found, removing the entry from the set-associative buffer.

8. The method of claim 7 further comprising:

searching an array of overflow indicators for an indication that the set-associative buffer has overflowed in the past; and modifying the array of overflow indicators to reflect a reduction in the number of overflows by one.

9. The method of claim 8 wherein the memory address is represented by M and the array is of integer size N, and searching the array comprises:

determining an overflow indicator address as M modulo N; and inspecting a value at the overflow indicator address.

10. The method of claim 7 further comprising:

looking up a counter value in a version count buffer, the counter value corresponding to the memory address associated with the first store instruction; and decrementing the counter value.

11. A method of executing instructions in an out-of-order processor, the method comprising:

receiving a first instruction to load a data value from a memory address; and searching a set of a set-associative buffer for a second instruction upon which the first instruction depends.

12. The method of claim 11 further comprising:

when the second instruction upon which the first instruction depends is found, retrieving the data value from the second instruction to execute the first instruction.

13. The method of claim 11 further comprising:

when the second instruction upon which the first instruction depends is not found, searching an array of overflow indicators for an indication of a prior set-associative buffer overflow; and if the indication of a prior set-associative buffer overflow is not found, executing the first instruction.

14. A memory disambiguation apparatus comprising:

a first queue to hold a first plurality of store instructions, the first plurality of store instructions being store instructions that are in an instruction window; and a set-associative buffer to hold a second plurality of store instructions organized in a plurality of sets to be searched for store instructions upon which any of a plurality of load instructions depend, each of the plurality of sets including a subset of the first plurality of store instructions, at least one of the second plurality of store instructions having resolved memory addresses included therewith.

15. The memory disambiguation apparatus of claim 14 further comprising:

at least one overflow indicator to indicate when at least one of the plurality of sets in the set-associative buffer overflows.

16. The memory disambiguation apparatus of claim 15 wherein the at least one overflow indicator comprises a counter having a value that reflects a number of overflow occurrences.

17. The memory disambiguation apparatus of claim 15 wherein the at least one overflow indicator comprises an array of counters, each counter of the array of counters having a value that reflects a number of overflow occurrences.

18. The memory disambiguation apparatus of claim 14 wherein the set-associative buffer provides data to any of the plurality instructions when a dependence is found.

19. The memory disambiguation apparatus of claim 14 wherein the first queue holds the first plurality of store instructions in a first plurality of queue entries, each of the first plurality of queue entries comprising:

a memory address field;

a data value field; and a queue entry identifier field.

20. The memory disambiguation apparatus of claim 19 wherein each of the first plurality of store instructions that has a resolved memory address in the memory address field is included in the second plurality of store instructions, and each of the first plurality of store instructions that does not have a resolved memory address in the memory address field is not included in the second plurality of store instructions.

21. A memory disambiguation apparatus comprising:

a set-associative buffer having a plurality of sets, each set including a plurality of buffer entries, each of the plurality of buffer entries including a tag field, wherein each of the plurality of buffer entries corresponds to one of a first plurality of store instructions in an instruction window; and a plurality of overflow indicators, each of the plurality of overflow indicators having a one-to-many relationship with the plurality of buffer entries in the set-associative buffer.

22. The memory disambiguation apparatus of claim 21 further comprising:

a first queue including a first plurality of queue entries, wherein each of the first plurality of queue entries corresponds to one of a second plurality of store instructions, the first plurality of queue entries being a subset of the second plurality of store instructions.

23. The memory disambiguation apparatus of claim 22 wherein each of the plurality of buffer entries has a resolved memory address associated therewith.

24. The memory disambiguation apparatus of claim 22 further comprising a second queue having a second plurality of queue entries, wherein each of the plurality of second queue entries corresponds to one of a plurality of load instructions in the instruction window.

* * * * *

UNITED STATES PATENT AND TRADEMARK OFFICE
CERTIFICATE OF CORRECTION

PATENT NO. : 6,591,342 B1
DATED : July 8, 2003
INVENTOR(S) : Haitham Akkary and Sebastien Hily It is certified that error appears in the above-identified patent and that said Letters Patent is hereby corrected as shown below:

<u>Column 16,</u>
Line 17, insert -- of load -- after "plurality".

Signed and Sealed this

Fourteenth Day of October, 2003

JAMES E. ROGAN
*Director of the United States Patent and Trademark Office*